Jan. 9, 1968          M. A. NOBLE          3,362,225
PRESSURE-TESTING APPARATUS
Filed Aug. 17, 1965          2 Sheets-Sheet 1
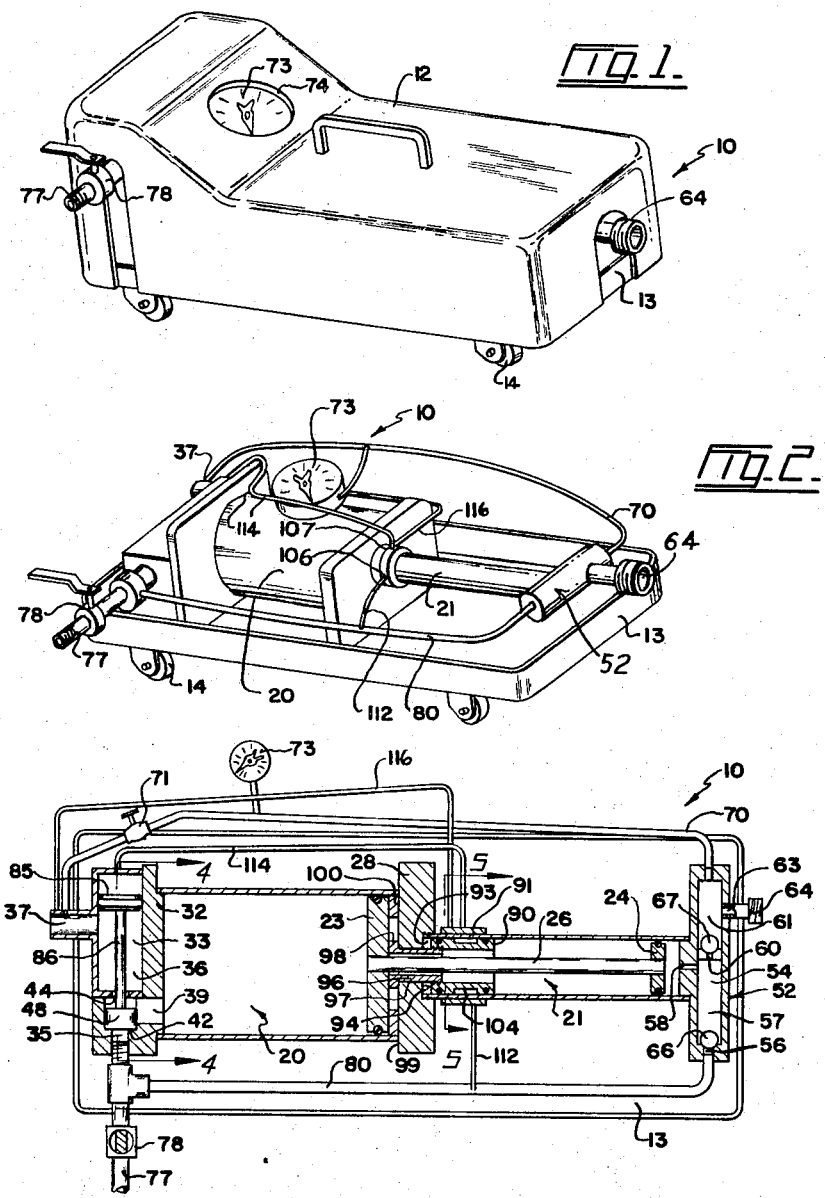
INVENTOR
MARSHALL A. NOBLE Jan. 9, 1968                M. A. NOBLE                3,362,225
                        PRESSURE-TESTING APPARATUS
Filed Aug. 17, 1965                                    2 Sheets-Sheet 2

INVENTOR
MARSHALL A. NOBLE
BY
ATTORNEYS

United States Patent Office 3,362,225
Patented Jan. 9, 1968

3,362,225
PRESSURE-TESTING APPARATUS
Marshall A. Noble, 2684 E. 1st Ave.,
Vancouver, British Columbia, Canada
Filed Aug. 17, 1965, Ser. No. 480,276
9 Claims. (Cl. 73—49.1)

ABSTRACT OF THE DISCLOSURE

Apparatus for pressure-testing devices, such as hoses, receptacles and the like, and adapted to be connected to a source of testing fluid under pressure, and utilizing the pressure of said fluid automatically to pump said fluid into the devices up to pressures exceeding that of the testing fluid, said apparatus being operable to retain the fluid in the devices for as long as desired, and then to permit the fluid to drain out of the devices.

---

This invention relates to apparatus for pressure-testing devices, such as hoses and receptacles, which are subjected to pressure during use.

Hoses, and particularly fire hoses, are periodically tested at predetermined pressures to see whether they are still in good condition.

For example, fire hoess are periodically tested at pressures ranging from roughly 200 pounds to 600 pounds per square inch. This apparatus is particularly designed for testing hoses, but it can be used for testing receptacles or tanks at desired pressures for leaks and the like. For the sake of convenience, the apparatus is described herein in connection with the testing of hoses.

When a hose is to be tested, one end is plugged, and the opposite end connected to the present testing apparatus. Water is directed into the apparatus to fill the hose and then to increase the pressure therein to the desired point. All the operator has to do after connecting the hose, is to turn on the water, and when the desired pressure is reached, which is indicated by a pressure gauge forming part of the apparatus, he turns off the water, and operates another valve to permit the hose to drain. No manual pumping is required. The water supplied to the apparatus may be from a tap of an ordinary water system or from some other source. An important advantage of this apparatus lies in its simplicity of construction, its low cost, and the fact that it is water-operated and does not include any electrical apparatus.

The present pressure-testing device comprises first and second cylinders, the latter being of smaller diameter than the first cylinder. Pistons slidably mounted in these cylinders are connected together so as to move as a unit. Passage means in communication with an end of the first cylinder is adapted to direct fluid into said end and to a drain outlet. A directional valve in this passage means is operable to permit fluid to flow into the first cylinder and not to the drain outlet or to flow from the first cylinder to the drain outlet while preventing flow of fluid into said cylinder. Second passage means is provided for the second cylinder and is adapted to direct fluid into an end of this second cylinder and to an outlet to which a device, such as a hose, to be tested can be attached. A valve-controlled drain is provided for the second passage means, and the apparatus includes means for directing pressure fluid to both of said passage means. Check valve means in the second passage means permits fluid to flow in one direction toward said outlet and prevents flow of fluid in the opposite direction. It is preferable also to provide a pressure indicating device for the second passage means.

Figure 4:
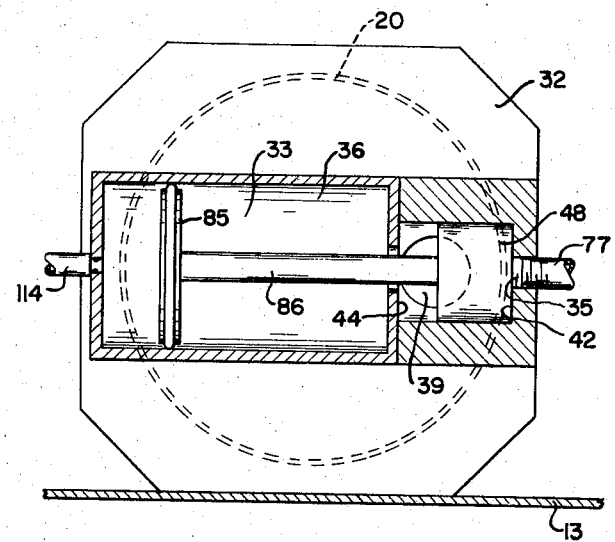
Figure 5:
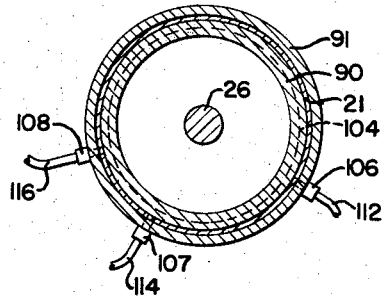

An example of this invention is illustrated in the accompanying drawings, in which, FIGURE 1 is an isometric view of the pressure-testing apparatus, FIGURE 2 is a similar view of the apparatus with the cover removed, FIGURE 3 is a longitudinal horizontal section through the apparatus, FIGURE 4 is an enlarged vertical section taken on the line 4—4 of FIGURE 3, and FIGURE 5 is an enlarged vertical section taken on the line 5—5 of FIGURE 3.

Refering to the drawings, 10 is pressure-testing apparatus according to the present invention including a casing or cover 12 removably mounted on a base 13 which may ride on rollers 14. The working elements of this apparatus are mounted on base 13, and are illustrated in FIGURES 2 to 5.

Apparatus 10 includes a pumping unit made up of first and second cylinders 20 and 21, cylinder 21 being of smaller diameter than cylinder 20. These cylinders are close to each other, and are preferably arranged co-axially, as shown. A first piston 23 is slidably mounted in cylinder 20, and a second piston 24 of smaller diameter is slidably mounted in cylinder 21. Suitable means is provided for interconnecting pistons 23 and 24 so that they move together, and in this example, the pistons are connected by a rod 26, said rod extending through a wall 28 which is common to both cylinders.

Cylinder 20 has a relatively thick wall 32 at its outer end, said wall having passage means 33 therein. This passage means includes an inlet 35, a passage 36 extending horizontally from the inlet to a drain outlet 37, and a port 39 between outlet 37 and inlet 35 and bringing said passage 36 into communication with the interior of cylinder 20. A seat 42 is formed in passage 36 between inlet 35 and port 39, and another seat 44 is formed in said passage between port 39 and drain outlet 37. A directional valve 48 is located in passage 36 and is adapted to move from a position on seat 42 to another position on seat 44. When valve 48 is on seat 42, port 39 is in communication with outlet 37 through seat 44 and passage 36, and when the valve is on seat 44, port 39 is in communication with inlet 35.

A fitting 52 is provided at the outer end of cylinder 21, said fitting having passage means 54 therein. This passage means includes an inlet 56, a flow chamber 57, a small port or passage 58 between chamber 57 and the interior of cylinder 21, an outlet 60 from said chamber on the side of port 58 remote from inlet 56, a passage 61 extending from outlet 60 to an outlet 63 to which a hose or other device to be tested can be attached. In this example, part 64 of a hose connector is provided at outlet 63. Check valves 66 and 67 are provided at inlet 56 and outlet 60 respectively opening towards and away from flow chamber 57.

A valve-controlled drain is provided for passage 61, and in this example, a pipe 70 extends from the passage to drain outlet 37. This is done for convenience so that water can be conducted away from the apparatus by a suitable hose, not shown, attached to outlet 37. A release valve 71 is provided in pipe 70. A pressure gauge is provided for indicating the pressure in passage 61, and in this example, a gauge 73 is connected to pipe 70 so that it can be seen through an opening 74 in casing 12, see FIGURE 1.

When apparatus 10 is in operation, water under pressure is directed to passage means 33 and 54. In the illustrated form of the invention, a pipe 77 is adapted to be connected to a suitable source of supply, said pipe having a shut-off valve 78 therein. Pipe 77 is connected to end wall 32 over inlet 35, and another pipe 80 extends from pipe 77 to inlet 56 of fitting 52.

Manual means may be provided for shifting directional valve 48 between seats 42 and 44, but it is preferable to do this automatically. For this purpose, a piston 85 is slidably mounted in passage 36 on the side of drain outlet 37 remote from seat 44, said piston being connected by a stem 86 to valve 48, said stem extending freely through seat 44. It will be noted that the diameter of piston 85 is larger than the diameter of valve 48.

Suitable means is provided for directing water under pressure into the upper part of passage 36 to move piston 85 to shift valve 48 against seat 42. A servo valve 90 is provided for this purpose, said valve being slidably mounted in a servo cylinder 91 which, in this example, is part or an extension of cylinder 21 adjacent wall 28. Servo cylinder 91 extends into a recess 93 formed in wall 28, the bottom 94 of said recess forming a stop for the servo valve. A sleeve 96 slidably extends through a bore 97 in wall 28 centrally of recess 93 and is connected to valve 90, said sleeve slidably fitting around piston rod 26. Sleeve 96 is formed with a collar 98 on an end thereof projecting into cylinder 20. When valve 90 is against stop 94, collar 98 is spaced from the surface 99 of wall 28, and when said collar bears against said wall surface 99, valve 90 is spaced from stop 94, as shown in FIGURE 3. A sealing ring 100 is provided in cylinder 20 at wall 28, and sleeve 96 and its collar 98 are of such length that when valve 90 is against stop 94, said collar extends inwardly a little beyond the plane of sealing ring 100. With this arrangement, when piston 24 engages valve 90 and moves it against stop 94, sleeve collar 98 projects into cylinder 20 so that when piston 23 moves against ring 100, it engages collar 98 to move it and sleeve 96 and thereby moves valve 90 a short distance in the same direction as the movement of said piston. In other words, valve 90 is shifted back and forth by pistons 23 and 24 as said pistons approach the inner ends of their respective cylinders.

Servo valve 90 has an annular groove 104 in the outer surface thereof substantially midway between its ends. Pressure port 106, operating port 107 and drain port 108 are provided in cylinder 91 adjacent annular groove 104. Port 106 is connected by a pipe 112 to pipe 80, port 107 is connected by pipe 114 to the end of passage 36 beyond valve 85, and port 108 is connected by a pipe 116 to drain outlet 37. Ports 106, 107 and 108 are so located relative to each other and to groove 104 of valve 90 that ports 107 and 108 are in communication with each other through groove 104 when the valve is against stop 94, port 106 being closed off at this time by the valve, and ports 106 and 107 are in communication with each other when valve 90 is moved away from said stop, at which time port 108 is closed by the valve.

The operation of apparatus 10 is very simple and automatic. FIGURE 3 shows piston 23 positioned at the inner end of cylinder 20, at which time servo valve 90 is shifted to the right by sleeve 96 so that ports 106 and 107 are in communication through valve groove 104, and port 108 is closed off. An end of the hose to be tested is connected to part 64 of apparatus 10, the opposite end of said hose being closed off in any convenient manner. Pipe 77 is connected to a suitable source of water under pressure, and this may be by means of a hose to an ordinary water tap. The apparatus is set into operation by opening valve 78. Water under pressure travels through pipes 80, 112 and 114 and moves piston 85 horizontally to press valve 48 against seat 42. This shuts off port 39 from inlet 35. Water from pipe 80 also travels through inlet 56, flow chamber 57, passage 61 and through outlet 63 into the hose to fill the latter. When the hose is full, water from flow chamber 57 will flow through port 58 into cylinder 21 to move pistons 24 and 23 to the left in FIGURE 3. This movement continues until piston 24 engages and moves valve 90 against stop 94, at which time, ports 107 and 108 are brought into communication while port 106 is closed off. The pressure against piston 85 is released since the end of passage 36 is now in communication with drain outlet 37 through pipe 114, port 108, piston groove 104, port 107 and pipe 114, so that water from pipe 77 passes through inlet 35 to lift valve 48 off seat 42 and to press it against seat 44, at which time water flows through port 39 into cylinder 20 to move pistons 23 and 24 to the right. As piston 23 is larger than piston 24, the latter forces water out of cylinder 21 through port 58 and outlets 60 and 63 into the hose to raise the pressure of the water therein. When piston 23 engages collar 98 of sleeve 96, the latter is shifted to the right, and this moves valve 90 in the same direction to bring ports 107 and 106 into communication with each other and to close port 108. This starts the pump pistons moving back in the opposite direction. This action continues automatically as long as desired. The pressure in the hose is indicated by gauge 73. When the desired testing pressure is reached, valve 78 is closed, and the pressure can be maintained in the hose as long as required. Then valve 71 is opened to allow the water to drain out of the hose through drain outlet 37.

Although it is preferable to make apparatus 10 so that it operates automatically as described, valve 48 may be manipulated manually at the end of each stroke of pistons 23 and 24. In this case, an operator would have to shift the valve horizontally to keep the apparatus operating, but this would be very easy to do, not requiring the strength that would be necessary to operate a hand pump.

What I claim as my invention is:

1. Apparatus for pressure-testing devices, such as hoses and receptacles, which are subjected to pressure during use, comprising a first cylinder, a second cylinder of smaller diameter than the first cylinder, first and second pistons respectively slidably mounted in the first and second cylinders, connecting means joining the first and second pistons to cause said pistons to move together, said first and second cylinders having outer ends located so that when the first piston means moves away from the outer end of the first cylinder, the second piston moves towards the outer end of the second cylinder and vice versa, first passage means in communication with the first cylinder at the outer end thereof, said first passage means being adapted to direct fluid into the outer end of the first cylinder and to a drain outlet, a directional valve in the first passage means operable to permit fluid to flow into the first cylinder and not to the drain outlet or to flow from the first cylinder to the drain outlet while preventing flow of fluid into said first cylinder, second passage means in communicatoin with the second cylinder at the outer end thereof, said second passage means being adapted to direct fluid into the outer end of the second cylinder and to an outlet to which a device to be tested can be attached, a valve-controlled drain for said second passage means, means for directing pressure fluid to the first and second passage means, and control means for the directional valve adapted to move the latter to a first position to permit fluid to flow from the first cylinder to the drain outlet and to permit said directional valve to move to a second position and allow fluid to flow from the first inlet into the first cylinder, said control means comprising a servo piston slidably mounted in a control cylinder forming part of said first passage means, means connecting the servo piston to the directional valve; a servo cylinder having a port to be connected to a source of pressure fluid, an operating port connected by pipe means to the cylinder of the first passage means, and a drain port; and a servo valve in the servo cylinder movable selectively to bring said pressure fluid port into communication with the operating port or the drain port into communication with said operating port.

2. Pressure-testing apparatus as claimed in claim 1 in which the servo cylinder forms part of said second cylinder near the end of the latter remote from said outer end thereof, said servo valve in the servo cylinder being movable in one direction by said second piston to bring the drain port into communication with the operating port and to close the pressure fluid port, and including moving means extending from within the first cylinder near the end thereof remote from its outer end to said servo valve, said moving means being engaged by the first piston as the latter approaches said remote end of the first cylinder to move said moving means and therefore the servo piston in the direction opposite said one direction to bring the pressure fluid port into communication with said operating port and to close the drain port.

3. Pressure-testing apparatus as claimed in claim 1 in which said first passage means comprises an inlet through which pressure fluid enters said first passage means, a passage extending from said inlet to the drain outlet, a port between the first cylinder and said passage, said directional valve being movable longitudinally of the first passage means between a position closing said inlet from the port and a position closing the drain outlet from the port.

4. Pressure-testing apparatus as claimed in claim 3 in which said second passage means comprising a flow chamber in communication with the second cylinder through a small port, an inlet for the chamber through which pressure fluid enters said second passage means, a check valve in the inlet opening towards the chamber, an outlet port for the chamber, a check valve in said outlet port opening away from the chamber, and a passage extending from said chamber outlet port to said valve-controlled drain.

5. Pressure-testing apparatus as claimed in claim 4 including a pressure indicator connected to said passage of the second passage means.

6. Apparatus for pressure-testing devices, such as hoses and receptacles, which are subjected to pressure during use, comprising a first cylinder, a second cylinder of smaller diameter than the first cylinder, first and second pistons respectively slidably mounted in the first and second cylinders, connecting means joining the first and second pistons to cause said pistons to move together, said first and second cylinders having outer ends located so that when the first piston means moves away from the outer end of the first cylinder, the second piston moves towards the outer end of the second cylinder and vice versa, first passage means in communication with the first cylinder at the outer end thereof, said first passage means being adapted to direct fluid into the outer end of the first cylinder and to a drain outlet, a directional valve in the first passage means operable to permit fluid to flow into the first cylinder and not to the drain outlet or to flow from the first cylinder to the drain outlet while preventing flow of fluid into said first cylinder, second passage means in communication with the second cylinder at the outer end thereof, said second passage means being adapted to direct fluid into the outer end of the second cylinder and to an outlet to which a device to be tested can be attached, a valve-controlled drain for said second passage means, and means for directing pressure fluid to the first and second passage means; said first passage means comprising an inlet connected to said pressure fluid directing means, a passage extending from said inlet to the drain outlet, a port between the first cylinder and said passage, a first seat in the passage between said port and inlet, a second seat in the passage between said port and the drain outlet, said directional valve being positioned in the passage between the first and second seats therein and being clear of the second seat when on the first seat and vice versa.

7. Pressure-testing apparatus as claimed in claim 6 including a servo piston slidable in a control cylinder forming part of said first passage means, means connecting the servo piston to the directional valve, and control means operable to direct pressure fluid into said control cylinder to move the servo piston to seat the directional valve on the first seat and to allow the pressure to escape from said control cylinder to permit pressure fluid from the inlet of the first passage means to move said directional valve from the first seat to the second seat.

8. Apparatus for pressure-testing devices, such as hoses and receptacles, which are subjected to pressure during use, comprising a first cylinder, a second cylinder of smaller diameter than the first cylinder, first and second pistons respectively slidably mounted in the first and second cylinders, connecting means joining the first and second pistons to cause said pistons to move together, said first and second cylinders having outer ends located so that when the first piston means moves away from the outer end of the first cylinder, the second piston moves towards the outer end of the second cylinder and vice versa, first passage means for the first cylinder at the outer end thereof, said first passage means including a first inlet in communication with the first cylinder and with a drain outlet, a directional valve in said first passage means operable selectively to permit fluid to flow from the first inlet to the first cylinder and not to the drain outlet or from the first cylinder to the drain outlet and not to the first inlet, a flow chamber in communication with the second cylinder at the outer end thereof, a second inlet for the flow chamber, a check valve in said second inlet and opening into the chamber, second passage means from the flow chamber to an outlet to which a device to be tested can be attached, a check valve in said second passage means opening away from the flow chamber, a valve-controlled drain for said second passage means, means for simultaneously directing fluid under pressure to the first and second inlets, and control means for the directional valve adapted to move the latter to a first position to permit fluid to flow from the first cylinder to the drain outlet and to permit said directional valve to move to a second position and allow fluid to flow from the first inlet into the first cylinder.

9. Apparatus for pressure-testing devices, such as hoses and receptacles, which are subjected to pressure during use, comprising a first cylinder, a second cylinder of smaller diameter than the first cylinder, first and second pistons respectively slidably mounted in the first and second cylinders, connecting means joining the first and second pistons to cause said pistons to move together, said first and second cylinders having outer ends located so that when the first piston means moves away from the outer end of the first cylinder, the second piston moves towards the outer end of the second cylinder and vice versa, first passage means for the first cylinder at the outer end thereof, said first passage means including a first inlet in communication with the first cylinder and with a drain outlet, a directional valve in said first passage means operable selectively to permit fluid to flow from the first inlet to the first cylinder and not to the drain outlet or from the first cylinder to the drain outlet and not to the first inlet, a flow chamber in communication with the second cylinder at the outer end thereof, a second inlet for the flow chamber, a check valve in said second inlet and opening into the chamber, second passage means from the flow chamber to an outlet to which a device to be tested can be attached, a check valve in said second passage means opening away from the flow chamber, pressure indicating means connected to said second passage means, and means for simultaneously directing fluid under pressure to the first and second inlets.

References Cited
UNITED STATES PATENTS

| | | | |
|---|---|---|---|
| 909,950 | 1/1909 | Schreidt | 73—46 |
| 1,473,963 | 11/1923 | Mills | 73—49.6 |
| 3,151,498 | 10/1964 | Heldenbrand | 73—49.2 |

LOUIS R. PRINCE, *Primary Examiner.*

J. NOLTON, *Assistant Examiner.*